(12) United States Patent
Hibbard

(10) Patent No.: US 8,177,515 B2
(45) Date of Patent: May 15, 2012

(54) WIND TURBINE BLADE

(75) Inventor: Paul Hibbard, Singapore (SG)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 12/895,373

(22) Filed: Sep. 30, 2010

(65) Prior Publication Data
US 2011/0081248 A1 Apr. 7, 2011

Related U.S. Application Data

(60) Provisional application No. 61/247,755, filed on Oct. 1, 2009.

(30) Foreign Application Priority Data

Oct. 1, 2009 (DK) ................................. 2009 01075

(51) Int. Cl.
*F03D 1/06* (2006.01)
(52) U.S. Cl. ...................................................... 416/226
(58) Field of Classification Search .................. 416/226, 416/233, 225
See application file for complete search history.

(56) References Cited

U.S. PATENT DOCUMENTS

| 7,841,835 B2 * | 11/2010 | Bagepalli et al. | 416/226 |
| 2009/0068017 A1 * | 3/2009 | Rudling | 416/219 R |
| 2009/0155084 A1 | 6/2009 | Livingston et al. | |
| 2010/0310379 A1 * | 12/2010 | Livingston | 416/229 R |
| 2011/0052403 A1 * | 3/2011 | Kawasetsu et al. | 416/226 |

FOREIGN PATENT DOCUMENTS

| DE | 102008055539 | 6/2009 |
| GB | 2157248 | 10/1985 |
| WO | WO2006/002621 | 1/2006 |
| WO | WO 2008/086805 | 7/2008 |
| WO | WO 2008/089765 | 7/2008 |
| WO | WO 2009/034291 | 3/2009 |

OTHER PUBLICATIONS

Dutton et al., Design concepts for sectional wind turbine blades, *European Wind Energy Conference*, (1999) pp. 285-288.
Examination Report from Danish Patent Office dated May 6, 2010.

* cited by examiner

*Primary Examiner* — Richard Edgar
(74) *Attorney, Agent, or Firm* — Wood, Herron & Evans, L.L.P.

(57) ABSTRACT

A sectional blade for a wind turbine comprising a first and a second blade section extending in opposite directions from a blade joint, and each blade section comprising a spar section forming a structural member of the blade. The blade sections are structurally connected by a spar bridge extending into the first and second blade sections to facilitate joining of the blade sections. The spar bridge comprises a stiffening member protruding from the spar bridge in a chord wise direction of the blade for increasing the edgewise stiffness of the blade, and wherein a part of the surface of the stiffening member is shaped to follow an inner surface contour of the blade. A method of manufacturing such a sectional blade is also disclosed.

19 Claims, 4 Drawing Sheets

WIND TURBINE BLADE

RELATED APPLICATIONS

This application claims priority from Denmark Application No. PA 2009 01075 which was filed on Oct. 1, 2009 and U.S. Provisional Application No. 61/247,755 filed on Oct. 1, 2009, the contents of which are incorporated by reference.

FIELD OF THE INVENTION

The present invention relates to a sectional blade for a wind turbine, the blade comprising at least a first and a second blade portion extending in opposite directions from a joint.

BACKGROUND

Modern wind turbines comprise a plurality of wind turbine rotor blades, typically three blades, each blade having a weight of up to 15 tons and a length of up to 55 meters or longer.

Traditionally, a blade comprises two shell parts, one defining a windward side shelf part and the other one defining a leeward side shell part. Each of the shell parts are traditionally made in one piece. To reinforce such a blade, a beam- or box-shaped, longitudinal and tubular element, i.e. a spar, can act as a reinforcing beam running lengthways, i.e. in the longitudinal direction of the blade. The spar is located in the cavity between the two wind turbine shell parts and extends substantially throughout the length of the shell cavity in order to increase the strength and stiffness of the wind turbine blade. A blade may further be reinforced by two or more spars placed lengthways side by side.

As the size of wind turbines and thus wind turbine blades are still growing, the production facilities and the transport means must be increased to handle blades of the required size. This also increases the demand on logistics and increases the associated costs.

SUMMARY OF THE INVENTION

It is an object of embodiments of the present invention to provide an improved wind turbine blade comprising at least two portions and to provide an improved method of manufacturing such a blade.

In a first aspect, the invention provides a sectional blade for a wind turbine, the blade comprising at least a first blade section and a second blade section extending in opposite directions from a blade joint, where each blade section comprises a spar section forming a structural member of the blade and extending lengthways, the first blade section and the second blade section being structurally connected by a spar bridge extending into the first and second blade sections to facilitate joining of the blade sections, and the spar bridge being connected in a spar joint to a spar section thereby forming a receiving spar section. The spar bridge comprises at least one stiffening member protruding from the spar bridge in a chord wise direction of the blade for increasing the edgewise stiffness of the blade. At least a part of the surface of the stiffening member is shaped to follow an inner surface contour of the blade.

In the context of the present invention the term "spar bridge" shall be understood as a member extending between two neighboring blade sections which member serves the function of interconnecting the two blade sections and which serves the purpose of joining the two sections. The spar bridge may be a separate member or may form an integral part of or be fastened to one of the two neighboring blade sections.

Each blade section may comprise two shell parts, one defining a windward side shell part and the other one defining a leeward side shell part. These shell parts may be assembled before joining the first and second blade sections.

When assembled, the first blade section and the second blade section are structurally connected by the spar bridge extending into both blade portions to facilitate joining of the blade sections.

The spar bridge may be a longitudinal element which may be box-shaped, cylindrical, or of any other shape such as e.g. an I-beam shape or quadrangular. The cross-sectional shape of the spar bridge in a direction transverse to the spar bridge and/or the sectional blade may be circular or polygonal such as triangular or quadrangular. The spar bridge may form part of the longitudinal strength and bending stiffness of the wind turbine blade, thus being part of the reinforcement of the blade. The spar bridge and receiving spar section may comprise spar caps joined by spar webs. As an example the caps may be oriented in a chord wise direction of the blade substantially following a part of the upper and lower shell parts. Hereby the caps joined by the web provide high stiffness under flapwise bending of the blade.

Furthermore, the spar bridge may be a solid, a partly solid, or a tubular element. In the context of the present invention, the term "tubular element" shall be understood as a hollow element with an elongated shape. The cross-sectional shape of one of the spar bridges may be non-uniform e.g. defining only one or even no line of symmetry. The outer geometry may be of a rectangular shape, a partly circular shape, an oval shape or any other shape. The inner geometry may be different from the outer shape, thus defining a tubular element in the form of an elongated ring of an arbitrary shape.

The spar sections may have an elongated form and may be hollow.

The blade sections may be smaller than normal blade shells, and the blade sections may be easier to transport from a manufacturing site to an assembly site for being assembled, compared to blades in one piece. Furthermore, the assembly site can be situated close to the place where the turbine blade it to be used.

By manufacturing the blade of different parts, these parts may be transported unassembled, thereby facilitating transport with the possibility of reducing the associated costs.

Further, the possibility to manufacture the turbine blade in sections may reduce the manufacturing costs in that the blade mould sizes may be correspondingly reduced and thereby the demands to the space required during manufacture as well as to the equipment for moving around and handling the blade sections and moulds.

By the blade joint according to the invention of a stiffening member protruding from the spar bridge in a chord wise direction of the blade, the edgewise stiffness of the spar bridge and thereby the blade over the length of the spar joint is increased. By the stiffening member protruding to form a tongue on the spar bridge is primarily obtained higher edgewise stiffness of the spar bridge and thereby of the spar and over the blade joint. Also the torsional stiffness of the spar may be increased by the stiffening member. Further, the relative movement at the connections of the spar and blade joint may hereby be minimised which may otherwise be hard if not impossible to realize with an extending spar bridge without such stiffening member. Hereby, any loads on the blade are transferred or carried over the spar joint providing a stronger blade joint and a blade of more predictable and controllable stiffness properties.

The stiffening member bay be formed as an integral part of the spar bridge or may alternatively or in addition hereto be bonded or fastened to the spar bridge by adhesive or other fastening means such as bolts, rivets or the like.

By allowing a part of the surface of the stiffening member to be shaped to substantially follow an inner surface contour of the blade is obtained that the width and/or height of the stiffening member may be maximized for the stiffening member or tongue to provide maximal stiffness to the spar bridge. The stiffening member partly shaped to follow an inner surface contour of the blade further increases primarily the torsional and shear stiffness of the joint.

When joining two blade portions, shear forces may occur between these blade sections when the blade rotates. It may thus be an advantage, if the spar sections are dimensioned relative to each other so that shear forces between one of the spar sections and the spar bridge can be transferred directly over the webs in the spar joint. The spar sections may be optimised both for a dominant flapwise bending moment from aerodynamic thrust loads and for the lesser edgewise gravity dominated loads.

The blade may comprise more than one joint and thus comprise more than two blade sections and more than one spar bridge for each joint.

The spar bridge may in one embodiment form an integral part of the first spar section, and the second spar section may be adapted to receive the spar bridge over a spar joint length so as to secure the spar bridge to the second spar section in the spar joint and may thus not be a separate element. Furthermore, the spar bridge may comprise an extension protruding from one of the spar sections and may thereby form an extending spar section.

In a further embodiment, the spar bridge may form a separate member, and each of the first and the second spar sections may be adapted to receive the spar bridge over a spar joint length so as to secure the spar bridge to the first and second spar sections in spar joints. Hereby, the length of the second blade section is reduced compared to if the spar bridge extends or protrudes here from.

In an embodiment of the sectional blade, the length of the stiffening member is equal to or longer than the spar joint length whereby the stiffness of the spar bridge in the edgewise direction of the blade is increased over the entire length of the spar joint. The stiffening member may be of an uneven cross sectional area and may as an example gradually or stepwise increase in width from a first position away from the blade joint and towards the blade joint and the end of the spar bridge.

Further, the stiffening member may extend into the first and second blade sections thereby providing increased edgewise and torsional stiffness in both blade sections on both sides of the blade joint. This may be achieved by a spar joint of a length extending across the blade joint by letting the receiving spar section and the spar bridge extend from each blade section. Alternatively, the spar joint may extend on only one side of the blade joint in which case the stiffening member may however still optionally extend into both the first and second blade sections.

In a further embodiment, the spar bridge may comprise two stiffening members protruding in opposite chord wise directions from the spar bridge. The spar bridge may then be connected to the receiving spar section by a box-in-box connection. By two stiffening members protruding in opposite chord wise directions from the spar bridge is obtained a further increase of the edgewise bending stiffness and torsional rigidity of the spar bridge and spar joint. Further may hereby be obtained a more symmetric spar joint reducing the torsional rotations over the spar joint which may otherwise arise in unsymmetrical joints. For unsymmetrical joints e.g. with only one stiffening member, the torsional rotation over the spar joint may be reduced or prevented by the application of one or more torsional pins connecting the blade sections near the trailing and/or leading edges of the blade joint.

In a further embodiment of the sectional blade, the receiving spar section may protrude from the first blade section and extend into the second blade section, and the receiving spar section may comprise a second stiffening member protruding from the receiving spar section in a chord wise direction opposite the first stiffening member protruding from the spar bridge. As described above, the two stiffening members protruding in opposite chord wise directions result in a further increase of the edgewise bending stiffness and torsional rigidity of the spar joint. Further may hereby be obtained a more symmetrical spar joint reducing the torsional rotations over the spar joint which may otherwise arise in unsymmetrical joints. The spar bridge may here be connected to the receiving spar section by a side-by-side connection such as e.g. a scarf joint.

The stiffening member may be shaped by comprising a plate element protruding from the upper and/or lower flapwise sides of the spar bridge whereby it is possible to obtain a stiffening member of low weight relative to its stiffness. The plate element may comprise a bent plate positioned to extend and protrude from both the uppermost and lowermost sides in the flapwise direction of the spar bridge.

Such stiffening member may be advantageous in being simple and cost-effective to manufacture and simple to connect to the spar bridge while also providing increased edgewise bending and torsional stiffness of the spar bridge.

Further, the stiffening member may comprise a plate element protruding from a centre part of the spar bridge further increasing the edgewise bending stiffness of the spar bridge and to some extent the torsional and shear stiffness of the spar.

The plate elements may comprise a laminate of layers of fiber reinforced material for providing optimal stiffness and strength to weight properties of the spar bridge.

The stiffening member may comprise biaxial reinforcement material thereby increasing the torsional rigidity. As an example the stiffening member may comprise layers of fiber reinforced material oriented in +/−45 degrees.

One or more of the spar sections may define a longitudinally extending cavity, and at least one of the spar bridges may extend into the cavity of a spar section whereby the spar section receives the spar bridge. In one embodiment, the cavity extends along the entire length of the blade section, whereas the cavity in other embodiments only extends through a part of the blade section. The cavity may define one or more engagement zones which is/are adapted to engage corresponding engagement zones of the spar bridge. It will be appreciated that the larger the area of the engagement zone(s) is, the larger the force applied to tension the two blade sections towards each other may be. In one embodiment, the entire inner surface of the cavity defines an engagement zone. The spar bridge may hereby be connected to the receiving spar section in a box-in-box joint where the spar bridge is received and inserted in a tubular spar section.

In an alternative embodiment, the spar bridge may be connected to the receiving spar section in a side-by-side joint. The spar section then receives the spar bridge such that an outer surface of the spar bridge engages an outer surface of the respective spar section. As an example the spar bridge and the spar section may be joined by e.g. a scarf joint over a joint length, a finger joint, a lap joint or other joint types. A scarf joint may be advantageous in yielding an optimal load transition over the entire spar joint length.

The blade may further comprise a fastening element adapted to fasten the spar bridge to the receiving spar section. As an example, the fastening element may comprise a bolt, a rivet or the like, extending transverse to the length of the spar section and the spar bridge, and through both of them to facilitate fixing of the spar bridge to the spar section in question, e.g. by attaching a nut to one end of the bolt. As a single bolt or rivet may in some embodiments not be sufficient of fix the spar bridge to the receiving spar section, the fastening element may comprise a plurality of bolts, rivets, or other fixing elements.

Alternatively or additionally, the fastening element may comprise one or more bolts, rivets or the like extending longitudinal to the length of the spar section and the spar bridge.

As a further alternative, the fastening element may comprise an adhesive adapted to bond the receiving spar section and the spar bridge together at least partly.

Other fastening elements may also be used. The above examples of fastening elements may be used separately or may be combined.

Further, the sectional blade may comprise a number of fastening elements provided at intervals along the spar joint length, hereby increasing the shear transfer between the spar bridge and the receiving spar section over the spar joint length.

Alternatively or in addition hereto, the fastening elements may be provided near both ends of the spar joint lengthways, thereby reducing the relative movement of the spar bridge and the spar section at the ends of the spar joint otherwise resulting in local loads and damage near the spar joint ends. Furthermore, by fastening the spar bridge to the receiving spar section near both ends of the spar joint lengthways is obtained that the bending and torsion loads are transferred over the entire spar joint length thereby maximising the spar and blade joint stiffness and strength.

At least a part of the receiving spar section may form part of an aerodynamically outer surface of the blade. Thus, at least one of the spar sections may not be completely encapsulated within the turbine blade shell parts. Hence, the spar may easier be transported from a manufacturing site to an assembly site compared to large blade shells or complete blades. The assembly site can be situated close to the place where the turbine blade it to be used. Further, less material may be used in the blade design by letting a spar section form part of an aerodynamically outer surface of the blade.

As it may be an advantage if the first and second blade portions can be separated again after joining them, the spar joint may facilitate disassembling and non-destructive separation of the blade sections from each other. This may especially be an advantage if a part of the blade needs repair or has to be replaced, as only the blade portion comprising the part in question needs to be replaced.

The joint may be approximately at the middle part of the blade providing blade sections of approximately the same length. However, the blade portions may also be of different length. As an example, the first blade section may define a main blade portion, whereas the second blade section may define a tip portion.

In an embodiment of the invention the second blade section may form a winglet. Winglets can attain different shapes such as e.g. a sharply bent tip in an angle from a few degrees to 90° relative to the lengthwise direction of the blade, or such as a gradually bent tip. Hereby is obtained that the blade may be transported in parts which may e.g. be relatively flat compared to a traditional blade with winglet, thereby facilitating transport with the possibility of reducing the associated costs.

The blade tip influences the performance of the wind turbine blade as well as the noise emission. By detachable mounting of the winglet to the rest of the blade, is obtained e.g. that the blade tip may by exchanged on existing wind turbines to thereby adjust the wind turbine performance or noise emission by attaching tips extending in different angles relative to the lengthwise direction of the blade or tips of different size and/or shape. Also, as the blade tip is often vulnerable to damage during transport, handling, or operation, a detachable blade tip or winglet according to the above may furthermore be advantageous in facilitating the exchange of a damaged blade tip. The advantages hereof may be the facilitation of transport and the possibilities of retrofitting or repair of the blade tip as described previously.

In a second aspect, the invention provides a method of manufacturing a sectional blade for a wind turbine according to any of the above, the method comprising the steps of:
  providing a first blade section and a second blade section;
  arranging the blade sections so that they extend in opposite directions from a joint; and
  structurally connecting the blade sections by use of a spar bridge.

It should be understood, that the features of the above-described first aspect of the invention may be applicable in relation to steps of the method of the second aspect of the invention.

In a third aspect, the invention provides a wind turbine comprising a sectional blade according to the first aspect of the invention. The sectional blade may be manufactured according to the second aspect of the invention. It should be understood, that the features of the first and second aspects previously described may also be applicable to the third aspect of the invention.

BRIEF DESCRIPTION OF THE DRAWINGS

In the following different embodiments of the invention will be described with reference to the drawings, wherein.

DETAILED DESCRIPTION OF THE DRAWINGS

Further scope of applicability of the present invention will become apparent from the following detailed description and specific examples. However, it should be understood that the detailed description and specific examples, while indicating preferred embodiments of the invention, are given by way of illustration only, since various changes and modifications within the scope of the invention will become apparent to those skilled in the art from this detailed description.

Figure 1:
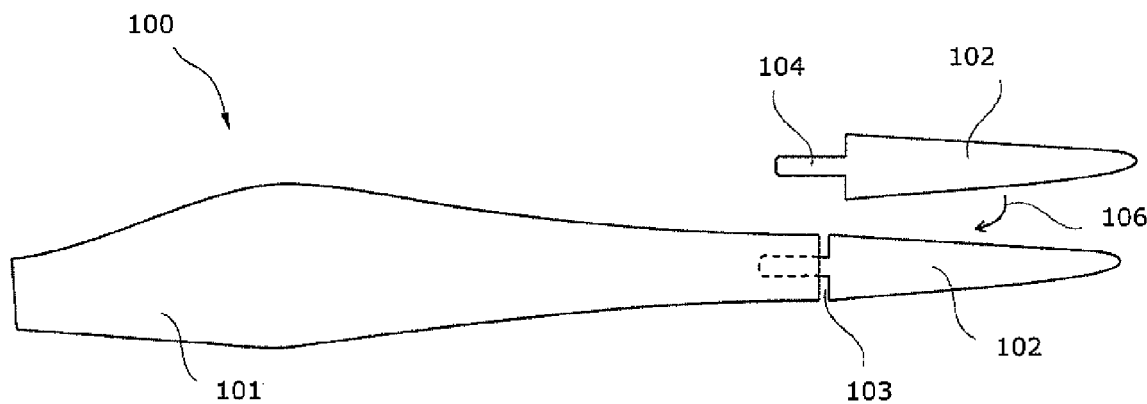
FIG. 1 illustrates an embodiment of a sectional blade comprising a first and a second blade section.

FIG. 1 shows a sectional blade 100 for a wind turbine according to one embodiment of the invention. The blade 100 comprises at least a first blade section 101 and a second blade section 102 extending in opposite directions from a blade joint 103. The first blade section 101 and the second blade section 102 are structurally connected by at least one spar bridge 104 extending into both blade sections 101, 102 to facilitate joining of said blade sections 101, 102.

The arrow 106 illustrates that the sectional blade 100 in the illustrated embodiment comprises two blade sections 101, 102, and that these blade sections 101, 102 are joined by inserting the spar bridge 104 into the first blade section 101.

The illustrated spar bridge 104 is a longitudinal beam element. It forms part of the longitudinal strength of the wind turbine blade 100, thus forming part of the reinforcement of the blade 100. Further, the spar bridge 104 in extending into both blade sections acts to carry and transfer bending loads of the blade across the blade joint.

Figure 2:
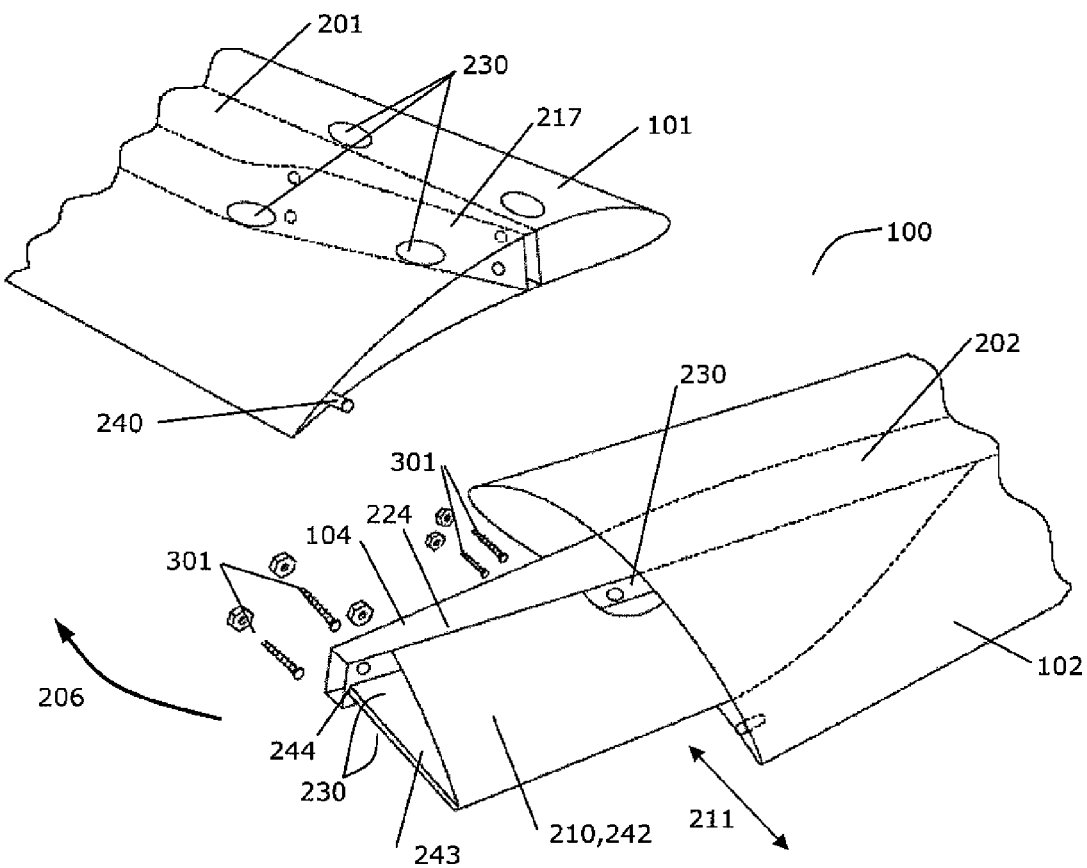
FIG. 2 illustrates an example of a joint between two blade sections according to the invention.

As illustrated in FIG. 2 each blade section 101, 102 comprises a spar section 201, 202 forming a structural member of the blade 100 and running lengthways, i.e. in the longitudinal direction of the blade 100. The spar sections 201, 202 are joined by the spar bridge 104. It should be understood, that for illustration purposes only parts of the blade sections 101, 102 are shown.

In the illustrated embodiment, the spar bridge 104 forms part of one of the blade sections 101, 102 and is consequently not a separate element. As illustrated, the spar bridge 104 forms part of the second blade section 102, and comprises an extension protruding from the second spar section 202, thereby forming an extending spar section. The first spar section 201 is adapted to receive and connect to the extension, and thereby forms a receiving spar section.

Both spar sections 201, 202 have an elongated form and the first spar section 201 is shaped to facilitate that the spar bridge 104 can be received by and connected to the first spar section 201 allowing the blade sections to be joined in a spar joint around the spar bridge 104, as illustrated by the arrow 206. In the FIGS. 3 and 4 are illustrated the same sectional blade as assembled and as seen from above and in the cross sectional view A-A of the airfoil and the spar joint next to the blade joint 103.

Figure 3:
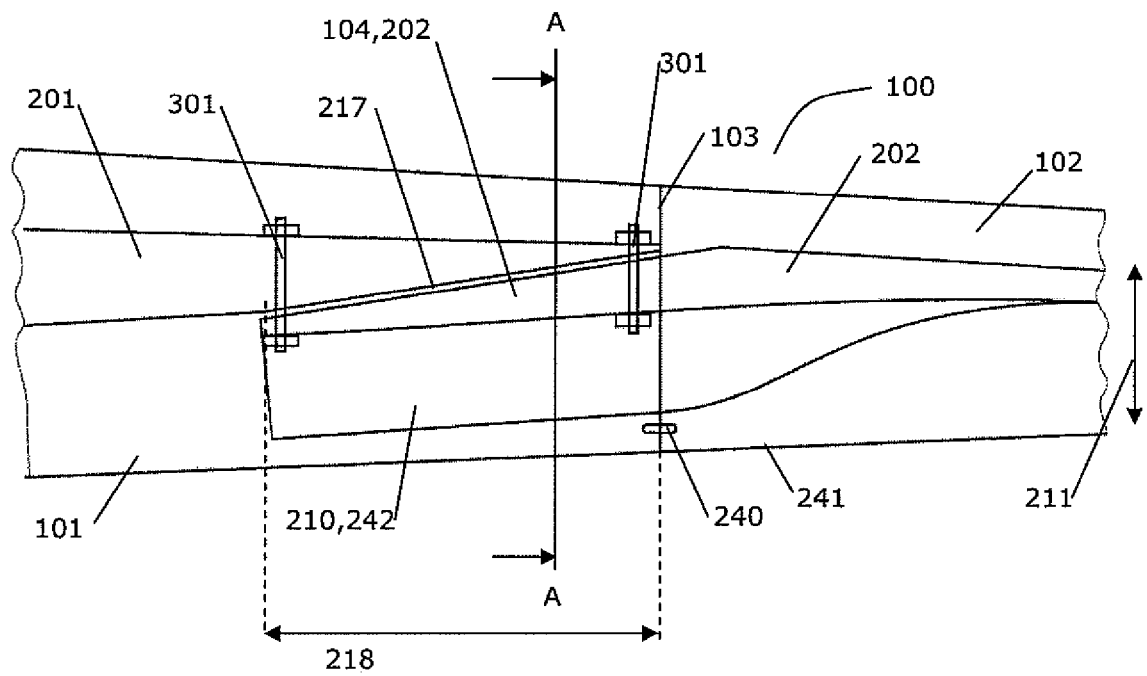
FIGS. 3 and 4 show the spar joint of the sectional blade of FIG. 2 as seen from above and in a cross sectional view from an end.
Figure 4:
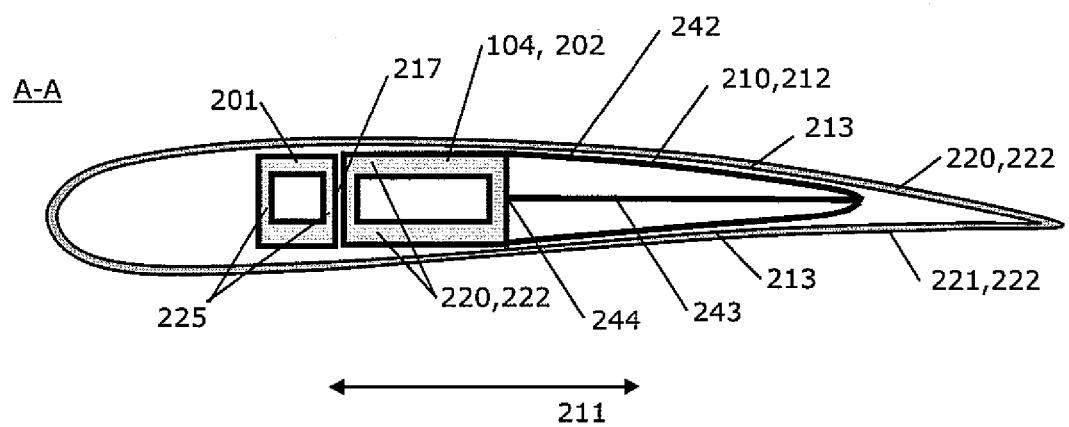

As illustrated in the FIGS. 2, 3 and 4, the bridge spar 104 comprises a stiffening member or tongue 210 protruding from the spar bridge 104 and extending in the chord wise direction 211 of the blade thereby increasing the bending stiffness under edgewise loading of the blade as well as the torsional stiffness of the blade joint enabling an improved load and moment transfer over the spar joint and thereby the blade joint.

Further, at least a part of the surface 212 of the stiffening member 210 is shaped to substantially follow an inner surface contour 213 of the blade. In the shown example, a part of the surface of the stiffening member 210 substantially follow the inner contour of the leeward or upper shell part 220, while another surface part substantially follows a portion of the windward or lower shell part 221 of the blade. The stiffness of the spar bridge is thereby increased maximally, as the stiffening member is hereby shaped to take up the maximum space within the airfoil section.

A torsion pin 240 is provided near the trailing edge 241 to partly or fully take up torsional rotations over the blade joint 103. A further torsion pin may likewise be provided near the leading edge of the blade.

The stiffening member 210 comprises a plate element 242 extending from the upper and lower spar caps 224 and towards the trailing edge 241 in the chord wise direction of the blade 211. The stiffening member 210 further comprises a plate element 243 extending from a center part 244 of the spar bridge 104 increasing the stiffness of the stiffening member and thereby the spar bridge further.

Figure 9:
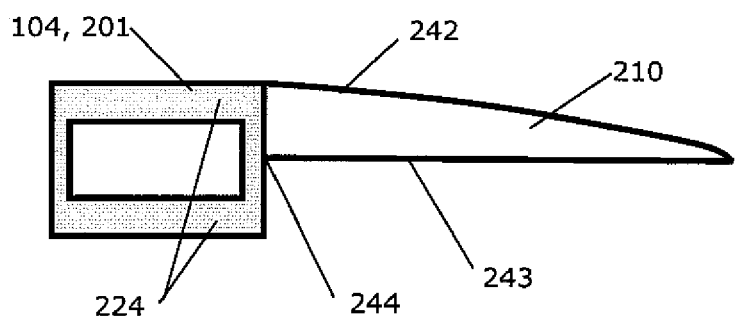
FIGS. 9 and 10 are cross sectional sketches of spars comprising differently shaped stiffening members.
Figure 10:
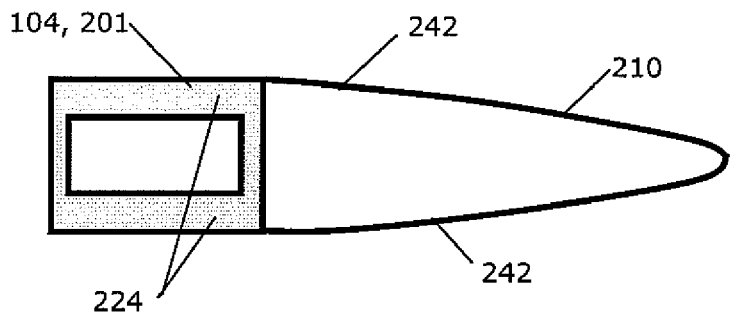

As sketched in the FIG. 9, the stiffening member 210 may be shaped as a tongue comprising a plate element 243 extending or protruding from a substantially central part 243 of the spar bridge or receiving spar section and a further plate element 242 extending from the upper or lower spar caps 224. Further, the stiffening member 210 may be shaped to extend as a tongue from the upper and lower spar caps 224 without a central plate element as sketched in FIG. 10.

The stiffening member 210 in the illustrated embodiment of FIGS. 2-4 extends lengthways over the entire spar joint length 218 and from then decreases gradually in width further into the blade section 102. The stiffening member may have a uniform width over the entire spar joint length or may have a gradually or stepwise decreasing width optionally following the width of the airfoil geometry.

The spar bridge 104 is connected to the receiving spar section 201 by a scarf joint 217 of a spar joint length 218. As illustrated in FIGS. 2 and 4 the receiving spar section 201 and the spar bridge 104 may be box-shaped each comprising two spar caps 224 joined by two spar webs 225, but may alternatively or partly in addition be solid or of other geometries. The upper and lower spar caps primarily take up the flexural and bending forces, while the spar webs 225 are primarily loaded in shear. One of the spar caps or both may form an integrated part of the blade shell 222 and may form part of the aerodynamic outer surface of the blade. Alternatively the spar caps in the blade sections may be attached to the blade shell e.g. by adhesives.

As illustrated in FIG. 3 the spar bridge 104 may be fastened to the receiving spar section 201 by fastening members such as bolts 301 which may extend in a chord wise direction 211 across the thickness of both the spar bridge and the receiving spar section. The bolts 301 may be placed at intervals over the full spar joint length 218, over a part of it, or at either or both ends of the spar joint as illustrated in FIG. 3. To facilitate the joining and optional later disassembling or non-destructive separation of the two blade sections, openings 230 (see FIG. 2) may be provided in the blade shell 220 and likewise in the stiffening member 210 for access to the fastening members 301.

Further, the spar bridge may be connected to the receiving spar section by means of adhesive instead of or in combination to the fastening members.

In the shown embodiments, the spar bridge as well as each of the spar sections may comprise laminates of layers of e.g. fiber reinforced materials. As the spar webs primarily act to take up shear forces, these may advantageously comprise layers of fiber reinforced materials with the fibers oriented in +/−45 degrees. The caps may comprise layers of fibers primarily oriented substantially in the longitudinal direction of the blade for maximal bending stiffness of the beams. Further, the stiffening element 210 may likewise comprise laminates of layers of e.g. fiber reinforced materials. The upper and lower plate elements 242 may advantageously comprise bi-directionally reinforced material such as layers of fiber reinforced materials with the fibers oriented in +/−45 degrees for taking up the shear forces in the stiffening member 210.

Figure 5:
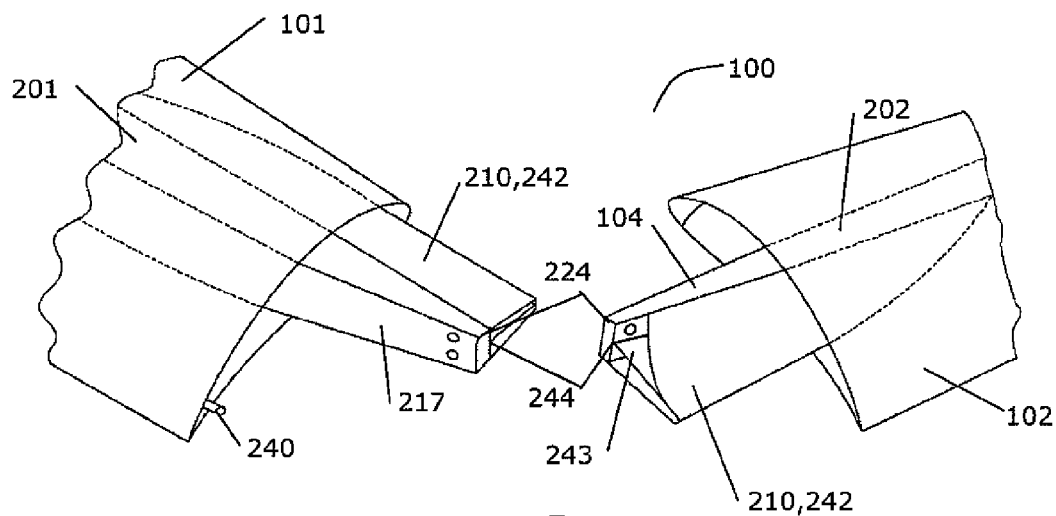
FIGS. 5-7 illustrate a spar joint of two stiffening members and in different views.
Figure 6:
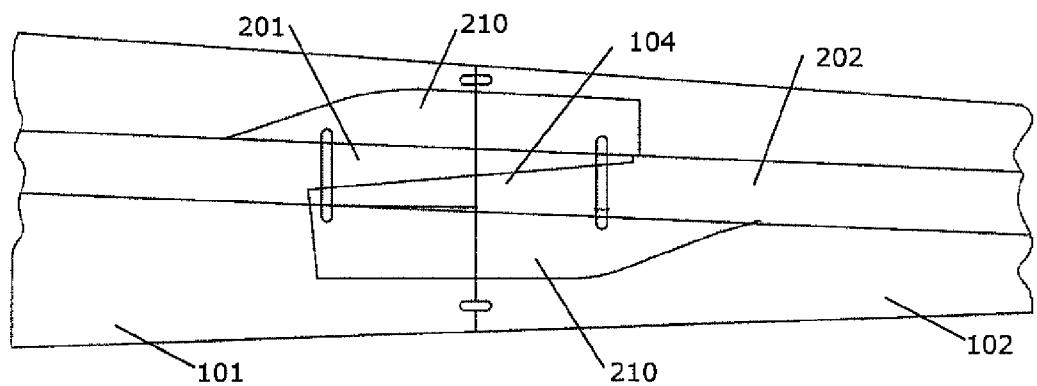
Figure 7:
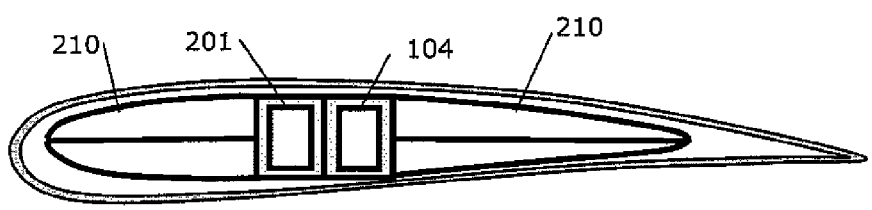

In the FIGS. 5, 6, and 7 are illustrated a symmetric embodiment of the blade joint as seen in an perspective view, in a top view, and in a cross sectional view, respectively. Both the extending spar bridge 104 and the receiving spar section 201 here comprise a stiffening member 210 in the shape of a tongue extending in the chord wise direction 211 from opposite sides. Here, both the spar bridge and the receiving spar section extend into the opposite blade section across the blade joint. The more symmetrical nature of the blade joint decreases the torsional rotations otherwise produced by the flapwise bending loads on the blade. The torsion pins 240 may therefore not be needed to take up the torsional rotation of the joint.

Figure 8:
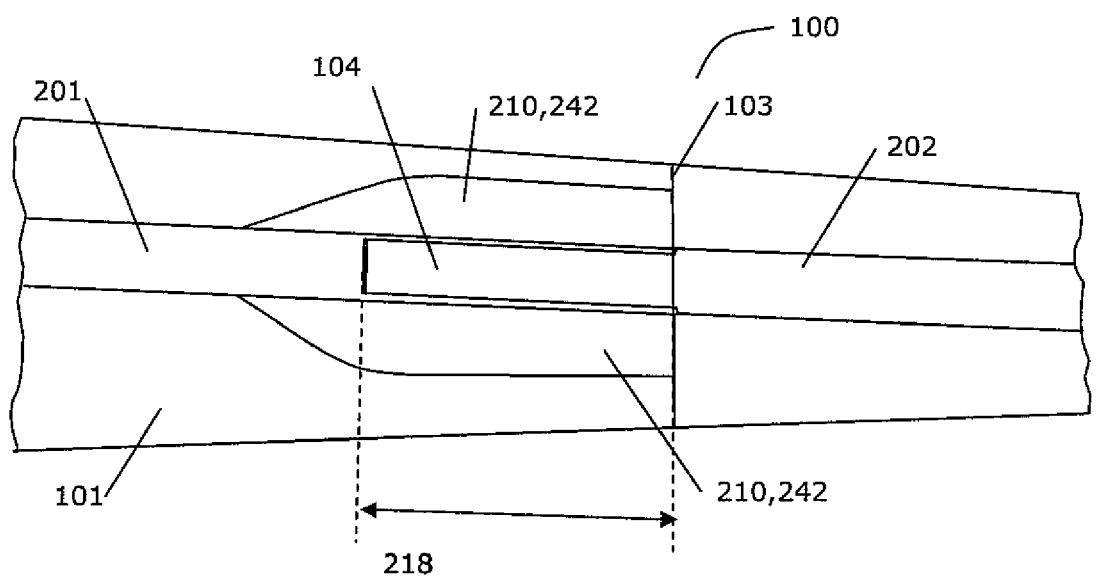
FIG. 8 illustrates in a top view a further embodiment of a spar joint according to the invention.

FIG. 8 illustrates an embodiment of a blade joint as seen from the top, where the spar bridge 104 and the receiving spar section 201 are connected in a box-in-box connection with the spar bridge being received in the hollow receiving spar section. The edgewise bending and torsional stiffness of the spar joint is here increased by the receiving spar section comprising two stiffening members 21 extending in opposite directions in the chord wise direction 211 of the blade. As in the previous shown embodiments the spar bridge may be connected to the spar section by means of fastening members such as bolt or alternatively or additionally of adhesive.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

The invention claimed is:

1. A sectional blade for a wind turbine, the blade comprising at least a first blade section and a second blade section extending in opposite directions from a blade joint, where each blade section comprises a spar section forming a structural member of the blade and extending lengthways, the first blade section and the second blade section being structurally connected by a spar bridge extending into said first and second blade sections to facilitate joining of said blade sections, the spar bridge being connected in a spar joint to a spar section thereby forming a receiving spar section, and wherein the spar bridge comprises at least one stiffening member protruding from the spar bridge in a chord wise direction of the blade for increasing the edgewise stiffness of the blade, and wherein at least a part of the surface of the stiffening member is shaped to substantially follow an inner surface contour of the blade.

2. The sectional blade according to claim 1, wherein the spar bridge forms an integral part of the first spar section, and wherein the second spar section is adapted to receive the spar bridge over a spar joint length so as to secure the spar bridge to the second spar section in the spar joint.

3. The sectional blade according to claim 1, wherein the spar bridge forms a separate member, and each of the first and the second spar sections are adapted to receive the spar bridge over a spar joint length so as to secure the spar bridge to the first and second spar sections in spar joints.

4. The sectional blade according to claim 2, wherein the length of the stiffening member is equal to or longer than the spar joint length.

5. The sectional blade according to claim 1, wherein the stiffening member extend into said first and second blade sections.

6. The sectional blade according to claim 1, wherein the spar bridge comprises two stiffening members protruding in opposite chord wise directions from the spar bridge.

7. The sectional blade according to claim 1, wherein the receiving spar section protrudes from the first blade section and extends into the second blade section, and wherein said receiving spar section comprises a second stiffening member protruding from said receiving spar section in a chord wise direction opposite the first stiffening member protruding from the spar bridge.

8. The sectional blade according to claim 1, wherein the stiffening member comprises a plate element protruding from the upper and/or lower flapwise sides of the spar bridge.

9. The sectional blade according to claim 1, wherein the stiffening member comprises a plate element protruding from a centre part of the spar bridge.

10. The sectional blade according to claim 1, wherein the stiffening member comprises a biaxial reinforcement material.

11. The sectional blade according to claim 1, wherein the spar bridge is connected to the receiving spar section in a side-by-side joint.

12. The sectional blade according to claim 11, wherein the side-by-side joint comprises a scarf joint.

13. The sectional blade according to claim 1, further comprising a fastening element adapted to fasten the spar bridge to the receiving spar section.

14. The sectional blade according to claim 13, wherein a number of fastening elements are provided at intervals along the spar joint length.

15. The sectional blade according to claim 13, wherein fastening elements are provided near both ends of the spar joint lengthways.

16. The sectional blade according to claim 13, wherein the blade joint facilitates disassembling of the blade sections from each other.

17. The sectional blade according to claim 13, wherein said second blade section forms a winglet.

18. A method of manufacturing a sectional blade for a wind turbine, the blade comprising at least a first blade section and a second blade section extending in opposite directions from a blade joint, where each blade section comprises a spar section forming a structural member of the blade and extending lengthways, the first blade section and the second blade section being structurally connected by a spar bridge extending into said first and second blade sections to facilitate joining of said blade sections, the spar bridge being connected in a spar joint to a spar section thereby forming a receiving spar section, and wherein the spar bridge comprises at least one stiffening member protruding from the spar bridge in a chord wise direction of the blade for increasing the edgewise stiffness of the blade, and wherein at least a part of the surface of the stiffening member is shaped to substantially follow an inner surface contour of the blade, the method comprising the steps of:
   providing a first blade section and a second blade section;
   arranging the blade sections so that they extend in opposite directions from a joint; and
   structurally connecting the blade sections by use of a spar bridge.

19. A wind turbine comprising a sectional blade the blade comprising at least a first blade section and a second blade section extending in opposite directions from a blade joint, where each blade section comprises a spar section forming a structural member of the blade and extending lengthways, the first blade section and the second blade section being structurally connected by a spar bridge extending into said first and second blade sections to facilitate joining of said blade sections, the spar bridge being connected in a spar joint to a spar section thereby forming a receiving spar section, and wherein the spar bridge comprises at least one stiffening member protruding from the spar bridge in a chord wise direction of the blade for increasing the edgewise stiffness of the blade, and wherein at least a part of the surface of the stiffening member is shaped to substantially follow an inner surface contour of the blade.

* * * * *